(12) United States Patent
Bostick et al.

(10) Patent No.: US 9,723,430 B2
(45) Date of Patent: *Aug. 1, 2017

(54) VEHICLE TO VEHICLE COMMUNICATION

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Arvind Singh, Waukegan, IL (US); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/995,757

(22) Filed: Jan. 14, 2016

(65) Prior Publication Data
US 2016/0127852 A1    May 5, 2016

Related U.S. Application Data

(63) Continuation of application No. 14/328,746, filed on Jul. 11, 2014, now Pat. No. 9,293,045.

(51) Int. Cl.
  *G08G 1/16* (2006.01)
  *H04W 4/00* (2009.01)
  *G08G 1/017* (2006.01)

(52) U.S. Cl.
  CPC ............ *H04W 4/005* (2013.01); *G08G 1/017* (2013.01); *G08G 1/162* (2013.01); *G08G 1/166* (2013.01); *H04W 4/008* (2013.01)

(58) Field of Classification Search
  CPC ...... G01G 1/017; G01G 1/162; G08G 1/0104; G08G 1/015; G08G 1/017; G08G 1/202;
  (Continued)

(56) References Cited

U.S. PATENT DOCUMENTS 8,307,037 B2    11/2012    Bain et al.
9,293,045 B2    3/2016    Bostick et al.
(Continued)

OTHER PUBLICATIONS

Capp, J. and Litkouhi, B. "The Rise of the Crash-Proof Car". IEEE Spectrum May 2014. Spectrum.IEEE.Org. North American. pp. 33-37.

(Continued)

*Primary Examiner* — Van Trieu
(74) *Attorney, Agent, or Firm* — William H. Hartwell

(57) ABSTRACT

A computer-implemented method, carried out by one or more processors, for vehicle to vehicle communication. In an embodiment, the method comprises the steps of receiving a first message selection, where the first message selection includes at least information associated with a road hazard. The method further comprises identifying a first directional RFID communicator of a first vehicle with a second directional RFID communicator of a second vehicle. The method further comprises, responsive to identifying the first directional RFID communicator of the first vehicle, sending the first message selection to the first directional RFID communicator from the second directional RFID communicator.

12 Claims, 4 Drawing Sheets

(58) Field of Classification Search
CPC ............... G08G 1/205; G08G 1/0965; G08G 1/096741; G08G 1/096795; B60Q 5/005; B60Q 5/006; B60Q 5/008
See application file for complete search history.

(56) References Cited

U.S. PATENT DOCUMENTS

| | | |
|---|---|---|
| 2002/0101332 A1 | 8/2002 | Talmadge et al. |
| 2007/0188348 A1 | 8/2007 | Bauer et al. |
| 2010/0019932 A1 | 1/2010 | Goodwin |
| 2011/0068949 A1 | 3/2011 | Ieda et al. |
| 2013/0229289 A1* | 9/2013 | Bensoussan ........... B60Q 5/006 340/902 |
| 2013/0245855 A1 | 9/2013 | Herger et al. |
| 2014/0343836 A1 | 11/2014 | Maise et al. |
| 2016/0012727 A1 | 1/2016 | Bostick et al. |

OTHER PUBLICATIONS

"Wireless Multi-Purpose Inter-Vehicle Data Sharing". An IP.com Prior Art Database Technical Disclosure. IP.com No. IPCOM000005021D. IP.com Electronic Publication: Jul. 16, 2001.
List of IBM Patents or Patent Applications Treated as Related, Dated Jan. 13, 2016, 2 pages.

* cited by examiner

VEHICLE TO VEHICLE COMMUNICATION

BACKGROUND

The present invention relates generally to the field of vehicle safety, and more particularly to the use of vehicle to vehicle communications for notification of driving hazards. In the present day, the number of vehicles on the road is increasing year-over-year. With the increase of vehicles on the road, the importance of driver safety increases as well, due to the residual effect of safety issues a single driver can pose for other drivers if the single driver does not resolve a safety issue. The safety issue can include driving too fast, driving with an under inflated tire, driving without headlights during inclement weather, or any other potential dangerous situation the single driver may pose to other surrounding drivers.

It is known for drivers to report driving hazards and/or traffic conditions in ways such as the following: (i) calling emergency services; (ii) calling a media outlet; and/or (iii) putting a call out on a citizens' band radio.

SUMMARY

Embodiments of the present invention disclose multiple methods for vehicle to vehicle communication.

A computer-implemented method, carried out by one or more processors, for vehicle to vehicle communication comprises the steps of receiving, by one or more processors, a first message selection, wherein the message first selection includes at least information associated with a road hazard; identifying, by one or more processors, a first directional RFID communicator of a first vehicle with a second directional RFID communicator of a second vehicle; and responsive to identifying the first directional RFID communicator of the first vehicle, sending, by one or more processors, the first message selection to the first directional RFID communicator from the second directional RFID communicator.

A computer-implemented method, carried out by one or more processors, for vehicle to vehicle communication comprises the steps of receiving, by one or more processors, at a second vehicle, a first message from a first vehicle; querying, by one or more processors, an engine control unit of the second vehicle to verify a portion of the first message; and responsive to verifying the portion of the first message, storing, by one or more processors, the portion of the first message.

A computer-implemented method, carried out by one or more processors, for vehicle to vehicle communication comprises the steps of orienting a directional radio frequency identification (RFID) transmitter device attached to a first moving vehicle so that a directionally oriented RFID signal will be reliably received by an RFID receiver attached to a second moving vehicle; and sending the directionally oriented RFID signal from the RFID transmitter device.

DETAILED DESCRIPTION

Some embodiments of the present invention recognize an opportunity for improved driver communication as follows: communications between surrounding drivers and the single driver experiencing the safety issue can allow for the single driver to resolve the safety issue, which otherwise can go unnoticed.

Embodiments in accordance with the present invention provide vehicle to vehicle communication by receiving a first message selection, where the message first selection includes a pre-established message or a customizable message. Embodiments in accordance with the present invention can identify one or more vehicles in a vicinity, wherein the vicinity is a surrounding area of a first vehicle and upon identifying the one or more vehicles, notifying the first vehicle that two or more vehicle were identified as being in the vicinity. Embodiments in accordance with the present invention can receive a second vehicle selection from the identified two or more vehicles and send the first selected message to the second selected vehicle.

Figure 1:
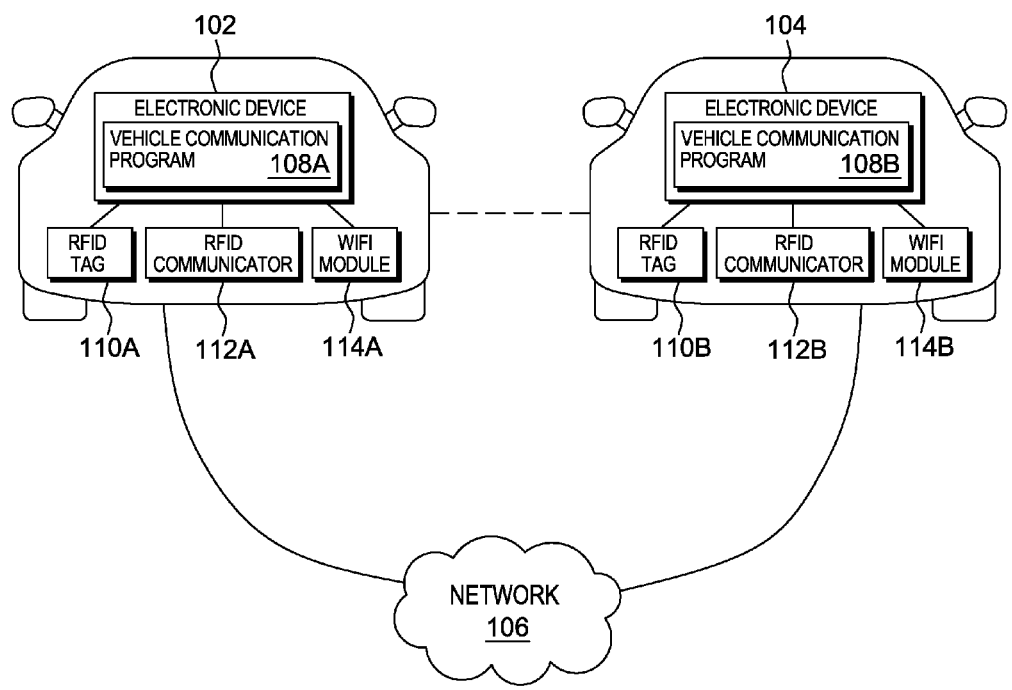
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes electronic device 102 and electronic device 104 all interconnected over network 106.

Electronic device 102 and 104 may be an engine control unit (ECU), a transmission control until (TCU), an integrated vehicle computer, a laptop computer, a tablet computer, a smartphone, or any programmable electronic device capable of receiving at least inputs and communicating with other electronic devices, network 106, RFID tag 110A and 110B, RFID communicator 112A and 112B, and WIFI module 114A and 114B. In this embodiment, electronic device 102 is located in a first vehicle and electronic device 104 is located in a second vehicle.

In this embodiment, vehicle communication program 108A and 108B respectively reside in electronic device 102 and 104. For discussion purpose, vehicle communication program 108A and 108B are the same program vehicle communication program 108 not illustrated in FIG. 1. Vehicle communication program 108 has the ability to send and receive messages concerning safety issues for a vehicle on the road. For example, vehicle communication program 108A can receive a pre-established message selection or a customized message selection from a user of electronic device 102 to send to other electronic devices in the vicinity. Vehicle communication program 108A can determine electronic device 104 with vehicle communication program 108B is in the vicinity and can sent the message selection to vehicle communication program 108B. Vehicle communication program 108B can receive the message selection and either display or audibly play the message sent from vehicle communication program 108A. Vehicle communication program 108 has the ability to code messages prior to sending messages as well as de-code message when receiving the message so the message being sent is not intercepted by other electronic devices in the vicinity.

RFID tag 110A and 110B are radio-frequency identification tags which respectively communicate with vehicle communication program 108A and 108B to provide vehicle information. In one embodiment, vehicle information can include a vehicle identification number (VIN), where communication program 108 has the ability to determine a color of a vehicle and a make or model of a car based on the VIN associated with RFID tag 110A and 110B. RFID communicator 112A and 112B are radio-frequency identification communicators which respectively communicate with communication program 108A and 108B to send messages, receive messages, and identify vehicle in the vicinity based on the RFID tag 110A and 110B. In this embodiment, RFID communicator 112A and 112B are directionally oriented in a manner, where the directional orientation dictates which vehicle is to receive a message being sent by vehicle communication program 108A and 108B. In another embodiment, vehicle communication program 108 can utilize RFID communicator 112 to scan for any RFID tag 110 within a pre-determined range, identify the vehicle information (e.g., make, model, and color) associated with a specific RFID tag 110 that is within the pre-determined range, and provide the vehicle information to a user of vehicle communication program 108. Based on the provided vehicle information, vehicle communication program 108 can receive a selection of a vehicle to send the message selection.

In another embodiment, Wi-Fi module 114A and 114B can respectively communicate with vehicle communication program 108A and 108B. For example, Wi-Fi module 114A and 114B allow vehicle communication program 108A and 108B to send and receive messages between electronic device 102 and 104. Wi-Fi module 114A can be associated with a vehicle and Wi-Fi module 114B can be associated with another vehicle, where each Wi-Fi module 114 utilizes a unique IP address.

In general, network 106 can be any combination of connections and protocols that can support communications between electronic device 102 and 104. Network 106 can include, for example, a local area network (LAN), a wide area network (WAN), such as the internet, a cellular network, or any combination of the preceding, and can further include wired, wireless, and/or fiber optic connections.

Figure 2:
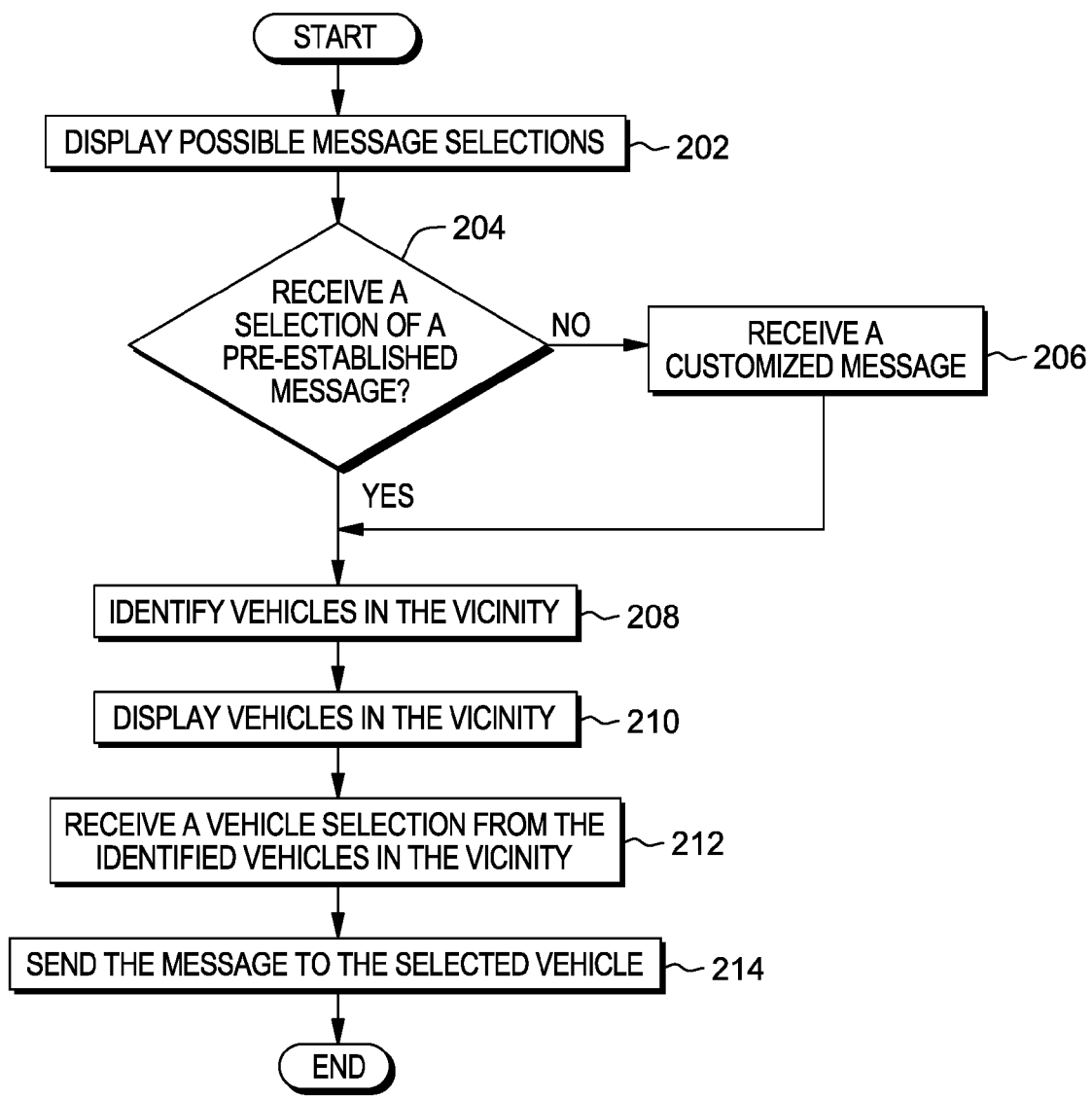
FIG. 2 is a flowchart depicting operational steps of a vehicle communication program sending a message to a vehicle, in accordance with an embodiment of the present invention.

FIG. 2 is a flowchart depicting operational steps of a vehicle communication program sending a message to a vehicle, in accordance with an embodiment of the present invention. For discussion purposes, vehicle communication program 108, residing in an electronic device of a first vehicle, is sending a message to another electronic device of a second vehicle.

Vehicle communication program 108 displays possible message selections (step 202). In this embodiment, possible message selections can include pre-established messages which vehicle communication program 108 can send from a first vehicle to a second vehicle. Vehicle communication program 108 can allow a user to store pre-established messages based on preference, where vehicle communication program 108 can receive a pre-established message selection rather than a user manually entering the message. Pre-established messages can include common safety messages such as, "Turn-On Head Lights", "Turn-Off High Beam", "Brake Light is Out", or any other safety message the user may want to be stored as a preference. Possible message selections can also include a custom message option, where vehicle communication program 108 can allow for the user to manually enter a message which is different from the pre-established messages. The custom message option can allow for the user to manually enter a message about an uncommon safety hazard.

In another embodiments, vehicle communication program 108 can send pre-established messages as coded messages. For example, a pre-established message such as, "Turn-On Head Lights" can have an equivalent coded message such as, "D3". Vehicle communication program 108A can send the coded message "D3" and vehicle communication program 108B can receive the coded message and determine the pre-established message associated with that particular coded message. In another example, a pre-established message such as, "Turn-Off High Beam" can have an equivalent coded messages such as, "D4".

Vehicle communication program 108 determines if a pre-established message selection is received (decision step 204). In the event, vehicle communication program 108 determines a pre-established message selection is received ("yes" branch, step 204), vehicle communication program 108 identifies vehicles in the vicinity (step 208). In the event, vehicle communication program 108 determines a pre-established message selection is not received ("no" branch, step 204), vehicle communication program 108 determines a customized message selection was received.

Vehicle communication program 108 receives a customized message (step 206). In this embodiment, vehicle communication program 108 can receive the customized message through a touch screen user interface of an electronic device in which vehicle communication program 108 resides. Vehicle communication program 108 can receive a message through manual inputs provided by the user. In another embodiment, vehicle communication program 108 can utilize audio recognition software to receive an audible custom message and then convert the audible custom message into a text format. Vehicle communication program 108 can also receive the audible custom message and send the audible message in an MP3 format via a first Wi-Fi module of a first vehicle to a second Wi-Fi module of a second vehicle.

Vehicle communication program 108 identifies vehicles in the vicinity (step 208). In this embodiment, vehicle communication program 108 can utilizes RFID communicator 112 to identify RFID tags within a given vicinity. The given vicinity is a programmable distance or area surrounding the vehicle in which vehicle communication program 108 resides. Each RFID tag 112 is associated with a specific vehicle through the use of a vehicle identification number (VIN), where each RFID tag 112 can include vehicle information such as a make and model of a vehicle, vehicle type, and vehicle color. Similarly, vehicle communication program 108 can receive a VIN and determine the vehicle information such as a make and model of a vehicle, vehicle type, and vehicle color through the received VIN. In another embodiment, vehicle communication program 108 can utilize Wi-Fi module 114 to communicate with other vehicles with a given vicinity. Each Wi-Fi module 114 is associated with a specific through the VIN, as well as, an IP address specific to the vehicle. Therefore, vehicle communication program 108 can direct a message to the vehicle based on the IP address specific to that vehicle.

Vehicle communication program 108 displays vehicles in the vicinity (step 210). In this embodiment, vehicle communication program 108 displays the vehicles in the vicinity in a user interface. In one example, vehicle communication program 108 can display vehicle information such as "Blue SUV" or "Grey Sedan" to allow the user to quickly identify the vehicle to which vehicle communication program 108 is to send the message. As previously mentioned, vehicle communication program 108 can determine the vehicle information from the VIN associated with the identified RFID tags. RFID communicator 112 can also include a camera to snap a picture of vehicles in the vicinity and vehicle communication program 108 can receive a manual selection of a picture of the vehicle to which vehicle communication program 108 is to send the message. In another example, a user can manually direct RFID communicator 112 to point at the vehicle to which vehicle communication program 108 is to send the message.

Vehicle communication program 108 receives a vehicle selection from the identified vehicles in the vicinity (step 212). In this embodiment, vehicle communication program 108 receive a vehicle selection to which vehicle communication program 108 is to send the message. Vehicle communication program 108 can also receive multiple vehicle selection to which vehicle communication program 108 is to send the message. Vehicle communication program 108 sends the message to the selected vehicle (step 214). Vehicle communication program 108 can send the message to the selected vehicle through RFID communicator 112 or through Wi-Fi module 114. In one embodiment, directional RFID communicator 112A on a first vehicle can send the message to directional RFID communicator 112B on a second vehicle. A user in the first vehicle can orient the RFID communicator 112A in a manner such that, RFID communicator 112A points in the direction of the second vehicle with RFID communicator 112B.

Figure 3:
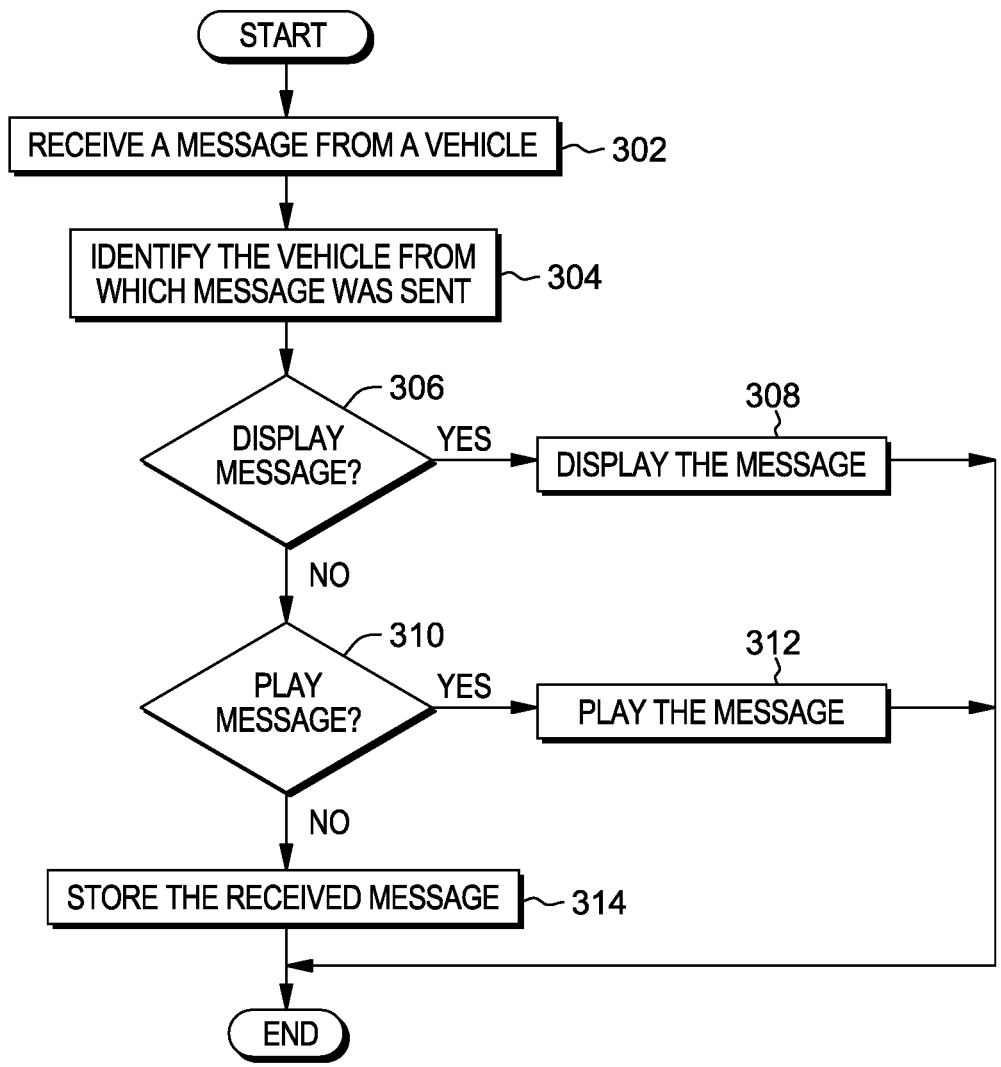
FIG. 3 is a flowchart depicting operational steps of a vehicle communication program receiving a message from a vehicle, in accordance with one embodiment of the present invention.

FIG. 3 is a flowchart depicting operational steps of a vehicle communication program receiving a message from a vehicle, in accordance with one embodiment of the present invention. For discussion purposes, vehicle communication program 108, residing in an electronic device of a second vehicle, is receiving a message from another electronic device of a first vehicle.

Vehicle communication program 108 receives a message from a vehicle (step 302). In this embodiment, vehicle communication program 108 receives a message along with a VIN associated with the vehicle which sent the message. Vehicle communication program 108 can receive the message in a coded form with associated metadata containing the VIN from the sending vehicle. For example, if the received message is a pre-established message, such as, "Turn-On Head Lights" can have a code such as "D3". Vehicle communication program 108 can receive the message code "D3" and can determine the received message associated with "D3" is "Turn-On Head Lights".

Vehicle communication program 108 identifies the vehicles from which the message was sent (step 304). In this embodiment, vehicle communication program 108 received the message along with a VIN of the vehicle from which the message was sent. Vehicle communication program 108 can utilize the information found in the VIN to identify the make and model of the vehicle, the vehicle body type, and the vehicle color. For example, vehicle communication program 108 can identify the vehicle from which the message was sent as a "Blue Sedan". In another example, vehicle communication program 108 can identify the vehicle from which the message was sent more specifically, for example, "Volkswagen Golf". The user of vehicle communication program 108 has the ability to change the specificity of the identified vehicle depending on preference.

Vehicle communication program 108 determines whether to display the message (decision step 306). In the event vehicle communication program 110 determines to display the message ("yes" branch, step 306), vehicle communication program 110 displays the message to the recipient (step 308). In the event vehicle communication program 108 determines not to display the message ("no" branch, step 306), vehicle communication program 108 determines whether to audibly play the message (step 310). Vehicle communication program 108 has the ability to determine if there is visual user interface in which the received message can be displayed. For example, if vehicle communication program 108 determines the vehicle does not have a visual user interface, vehicle communication program 108 can determine if the vehicle can audible play the message.

Vehicle communication program 108 displays the message (step 308). In this embodiment, vehicle communication program 108 displays the received message in an integrated vehicle computer, such as, a LCD screen used for a navigation system. Vehicle communication program 108 has the ability to prompt an overlaying display on the LCD screen containing the message and the identified vehicle information. Vehicle communication program 108 can also display the received message and the identified vehicle in an integrated heads-up display unit of the vehicle. In another embodiment, if a user of vehicle communication program 108 has a mobile phone connected to the vehicle via Bluetooth®, vehicle communication program 108 can send the received message and the identified vehicle to the connected mobile phone. The received message and the identified vehicle can be displayed on the screen of the connected mobile phone, where a passenger in the vehicle receiving the message can view the received message and the identified vehicle.

Vehicle communication program 108 determines whether to play the message (decision step 310). In the event vehicle communication program 108 determines to play the message ("yes" branch, step 310), vehicle communication program 108 audible plays the message (step 312). In the event vehicle communication program 108 determines to not play the message ("no" branch, step 310), vehicle communication program 108 determines to store the received message and identified vehicle information (step 314).

Vehicle communication program 108 plays the message (step 312). In this embodiment, vehicle communication program 108 audible plays the received message through the speakers of the vehicle in which vehicle communication program 108 resides. Prior to vehicle communication program 108 audibly playing the received message, vehicle communication program 108 can notify the recipient (i.e., the driver) of the vehicle that a message has been received. The notification can include a distinct audible tone that is distinguishable as being associated with vehicle communication program 108 receiving a message. Subsequent to playing the tone, vehicle communication program 108 can audibly play the message and the vehicle information associated with the vehicle which sent the message. In another embodiment, vehicle communications program 108 can determine a mobile phone is connected to the vehicle via Bluetooth® and can audible play the received message on the mobile device connected to the vehicle.

Vehicle communication program 108 stores the received message (Step 314). In this embodiment, vehicle communication program 108 determines not to display or audibly play the received message. Vehicle communication program 108 can store the received message along with the vehicle information so that a recipient can view the message a later time, for example, when the recipient is not operating a vehicle. Vehicle communications program 108 can also query the engine control unit (ECU) of the vehicle to verify that the received message contains information of a hazard which exists. For example, if vehicle communication program 108 receives a message such as, "Left Tail Light Out", vehicle communication program 108 can query the ECU, through an on-board diagnostics (OBD ii) port, of the vehicle to perform a diagnostics on the vehicle's lightening system. If vehicle communication program 108 receives a verification from the ECU that the left tail light is out, vehicle communication program 108 stores the received message. If vehicle communication program 108 does not receive a verification from the ECU that the left tail light is out, vehicle communication program 108 does not store the received message. There can be instances where the ECU identifies the issue as being intermittent, rather than persistent, in the lightning system. Vehicle communication program 108 can receive that information from the ECU and store it along with the received message and the identified vehicle which sent the message.

In some embodiments, vehicle communication program 108 might signal another vehicle by a user pinpointing one vehicle amongst many through put use of directional RFID. For example, in a manner in which police point a speed radar gun at ongoing traffic, the device can have the capability to send a radio frequency field directly at the target. In some embodiments, vehicle communication program 108 can have the capability to tie in on board diagnostics with the incoming message. For example, the receiving vehicle itself can verify the validity of the incoming information. Vehicle communication program 108 can include safe guarding against irrelevant messages coming across. Vehicle communication program 108 can use codes, as opposed to free forming messaging, as well as inclusion of the VIN associated with the vehicle sending the message. Additionally, in some embodiments, vehicle communication program 108 can include speech recognition for sending of the message and speech recognition for decoding the message as well. Vehicle communication program 108 can also allow for free-form text to be sent across from people with the proper authority (e.g., Police and Paramedics).

In some embodiments, the device (i.e., RFID transmitter device) is installed on a dashboard of a vehicle and can utilize a wide angle camera capable of scanning through live images (based on a field of view) as instructed by a driver of the vehicle. The device can receive voice instructions or a driver can manually orient the device to point at another vehicle to which the message is sent. In some embodiments, the device can both receive and transmit the information in the form of a message. The device has the ability to transmit a request for RFID information based on instructions the driver of the vehicle provides. RFID information can include vehicle's model, type, year, and make. The device can filter out the information and subsequently transmit actual messages to a particular vehicle in a group of two or more vehicles. However, if there is only one other vehicle in the field of view, the device can transmit the message rather than filtering out the RFID information prior to sending the message.

In an example, a driver of a first vehicle wants to send a message to a second vehicle, where the second vehicle is silver. The RFID device of the first vehicle can identify the second vehicle and utilize image processing to determine the color of the second vehicle as being the color silver. In the event there are multiple vehicles of the same color, the driver can utilize RFID information from the multiple vehicles to select the second vehicle to which the message is to be sent.

Figure 4:
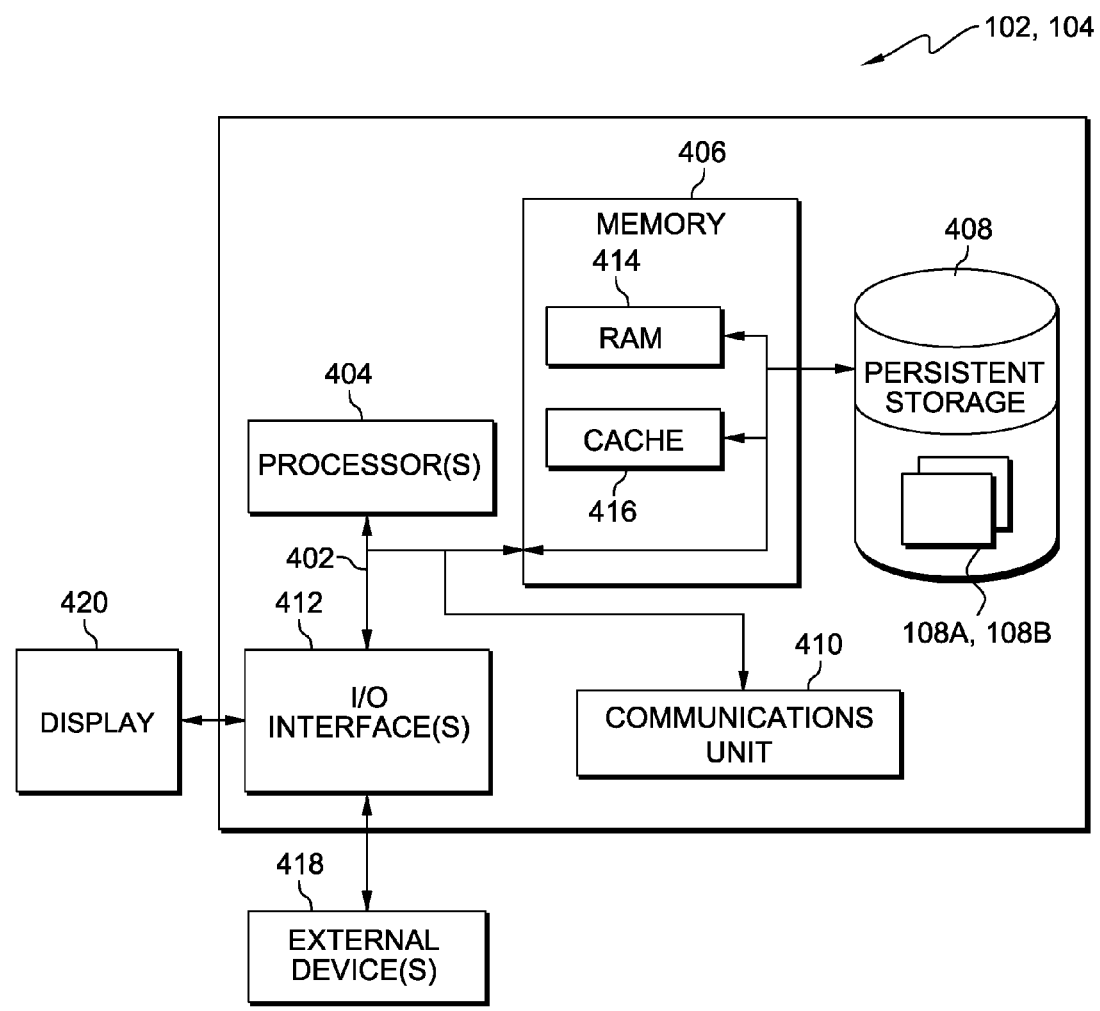
FIG. 4 is a block diagram of components of a computer system, such as the computer server of FIG. 1, in accordance with an embodiment of the present invention.

FIG. 4 depicts a block diagram of components of a computer, such as electronic device 102 and 104, respectively hosting vehicle communication program 108A and 108B in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Electronic device 102 and 104 respectively include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are examples of computer readable tangible storage devices. A storage device is any piece of hardware that is capable of storing information, such as, data, program code in functional form, and/or other suitable information on a temporary basis and/or permanent basis. In this embodiment, memory 406 includes random access memory (RAM) 414 and cache memory 416. In general, memory 406 can include any suitable volatile or non-volatile computer readable storage device.

Vehicle communication program 108A and 108B are respectively stored in persistent storage 408 for execution by one or more of computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including systems and devices within or controlled by electronic device 102 and 104. In these examples, communications unit 410 includes one or more wireless network interface cards. Communications unit 410 may provide communications through the use of either or both physical and wireless communications links. Computer programs and processes, such as vehicle communication program 108A and 108B, may be downloaded to persistent storage 408 through communications unit 410, or uploaded to another system through communications unit 410.

I/O interface(s) 412 allows for input and output of data with other devices that may be connected to electronic device 102 and 104. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 may also connect to a display 420. Display 420 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for vehicle to vehicle communication, the method comprising:
   receiving, by one or more processors, at a second vehicle, a first message from a first vehicle, wherein the first message includes information of one or more hazards on the second vehicle;
   querying, by one or more processors, a transmission control unit of the second vehicle to verify a first portion of the first message, wherein the first portion of the first message includes a first hazard verifiable by the transmission control unit of the second vehicle;
   verifying, by one or more processors, the first portion of the first message, wherein the first hazard exists or is intermittent on the second vehicle; and
   storing, by one or more processors, the first portion of the first message.

2. The method of claim 1, further comprising:
   querying, by one or more processors, an engine control unit of the second vehicle to verify a second portion of the first message, wherein the second portion of the first message includes a second hazard verifiable by the engine control unit of the second vehicle;
   verifying, by one or more processors, the second portion of the first message, wherein the second hazard exists or is intermittent on the second vehicle; and
   storing, by one or more processors, the second portion of the first message.

3. The method of claim 2, further comprising:
   identifying, by one or more processors, vehicle information associated with the first vehicle, wherein the vehicle information includes one or more of a make of a vehicle, a model of a vehicle, a vehicle type, and a color of a vehicle; and
   determining, by one or more processors, to display the second portion of the first message and vehicle information associated with the first vehicle in a user interface of the second vehicle.

4. The method of claim 1, further comprising:
   identifying, by one or more processors, vehicle information associated with the first vehicle, wherein the vehicle information includes one or more of: a make of a vehicle, a model of a vehicle, a vehicle type, and a color of a vehicle; and
   determining, by one or more processors, to display the first portion of the first message and vehicle information associated with the first vehicle in a user interface of the second vehicle.

5. A computer program product for vehicle to vehicle communication, the computer program product comprising:
   one or more computer readable storage media and program instructions stored on at least one of the one or more storage media, the program instructions comprising:
   program instructions to receive at a second vehicle, a first message from a first vehicle, wherein the first message includes information of one or more hazards on the second vehicle;
   program instructions to query a transmission control unit of the second vehicle to verify a first portion of the first message, wherein the first portion of the first message includes a first hazard verifiable by the transmission control unit of the second vehicle;
   program instructions to verify the first portion of the first message, wherein the first hazard exists or is intermittent on the second vehicle; and
   program instructions to store the first portion of the first message.

6. The computer program product of claim 5, further comprising program instructions, stored on the one or more computer readable storage media, which when executed by a processor, cause the processor to:
   query an engine control unit of the second vehicle to verify a second portion of the first message, wherein the second portion of the first message includes a second hazard verifiable by the engine control unit of the second vehicle;
   verify the second portion of the first message, wherein the second hazard exists or is intermittent on the second vehicle; and
   store the second portion of the first message.

7. The computer program product of claim 6, further comprising program instructions, stored on the one or more computer readable storage media, which when executed by a processor, cause the processor to:
   identify vehicle information associated with the first vehicle, wherein the vehicle information includes one or more of a make of a vehicle, a model of a vehicle, a vehicle type, and a color of a vehicle; and
   determine to display the second portion of the first message and vehicle information associated with the first vehicle in a user interface of the second vehicle.

8. The computer program product of claim 5, further comprising program instructions, stored on the one or more computer readable storage media, which when executed by a processor, cause the processor to:
   identify vehicle information associated with the first vehicle, wherein the vehicle information includes one or more of: a make of a vehicle, a model of a vehicle, a vehicle type, and a color of a vehicle; and
   determine to display the first portion of the first message and vehicle information associated with the first vehicle in a user interface of the second vehicle.

9. A computer system for vehicle to vehicle communication, the computer program product comprising:
   one or more computer processors;
   one or more computer readable storage media; and
   program instructions stored on the computer readable storage media for execution by at least one of the one or more computer processors, the program instructions comprising:
   program instructions to receive at a second vehicle, a first message from a first vehicle, wherein the first message includes information of one or more hazards on the second vehicle;
   program instructions to query a transmission control unit of the second vehicle to verify a first portion of the first message, wherein the first portion of the first message includes a first hazard verifiable by the transmission control unit of the second vehicle;
   program instructions to verify the first portion of the first message, wherein the first hazard exists or is intermittent on the second vehicle; and
   program instructions to store the first portion of the first message.

10. The computer system of claim 9, further comprising program instructions, stored on the one or more computer readable storage media, which when executed by a processor, cause the processor to:
    query an engine control unit of the second vehicle to verify a second portion of the first message, wherein the second portion of the first message includes a second hazard verifiable by the engine control unit of the second vehicle;
    verify the second portion of the first message, wherein the second hazard exists or is intermittent on the second vehicle; and
    store the second portion of the first message.

11. The computer system of claim 10, further comprising program instructions, stored on the one or more computer readable storage media, which when executed by a processor, cause the processor to:
    identify vehicle information associated with the first vehicle, wherein the vehicle information includes one or more of a make of a vehicle, a model of a vehicle, a vehicle type, and a color of a vehicle; and
    determine to display the second portion of the first message and vehicle information associated with the first vehicle in a user interface of the second vehicle.

12. The computer system of claim 9, further comprising program instructions, stored on the one or more computer readable storage media, which when executed by a processor, cause the processor to:
    identify vehicle information associated with the first vehicle, wherein the vehicle information includes one or more of: a make of a vehicle, a model of a vehicle, a vehicle type, and a color of a vehicle; and
    determine to display the first portion of the first message and vehicle information associated with the first vehicle in a user interface of the second vehicle.

\* \* \* \* \*